March 7, 1950     W. E. FARROW ET AL     2,499,737
LEVEL
Filed Feb. 9, 1948
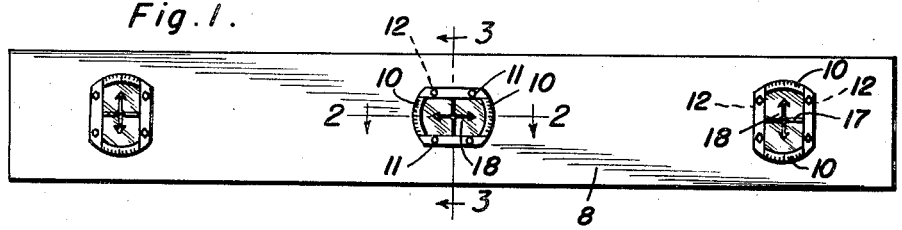
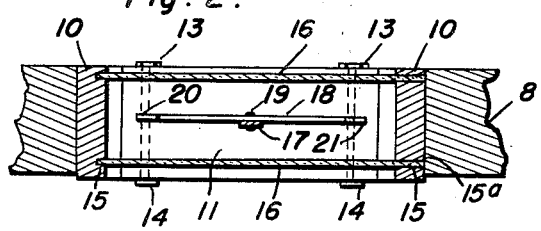 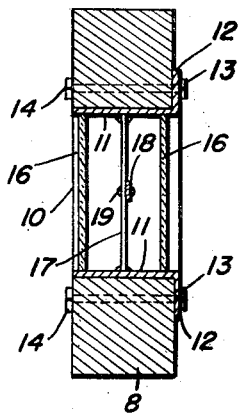
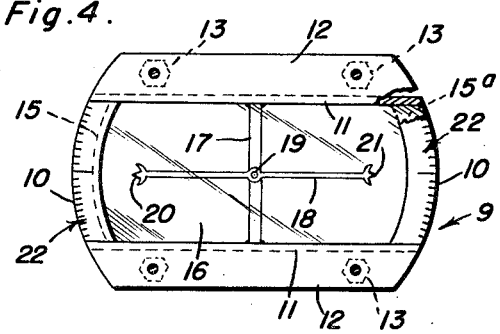
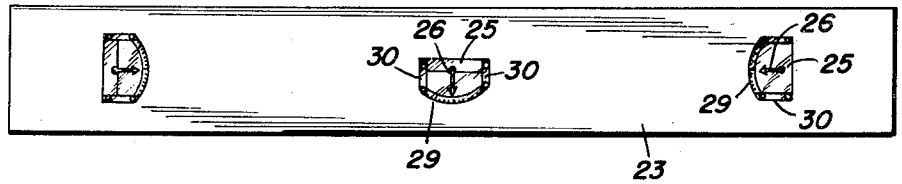
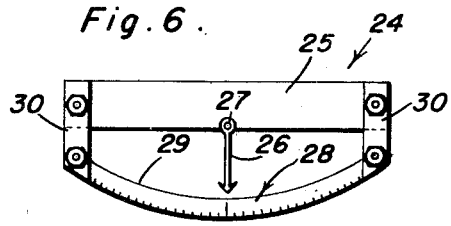
William E. Farrow
William L. Farrow
           INVENTORS Patented Mar. 7, 1950

2,499,737

UNITED STATES PATENT OFFICE 2,499,737

LEVEL

William E. Farrow and William L. Farrow, Newark, Ohio

Application February 9, 1948, Serial No. 7,174

1 Claim. (Cl. 33—215)

The present invention relates to an improved manually usable level, which while especially well adapted for use by carpenters and the like, is equally well adaptable for satisfactory use by workers engaged in all types of construction work.

More specifically, the improved level is suitable for practical use whenever and wherever the user desires to utilize same in accurately determining inclinations and verticalities of surfaces which are in angular relation to the horizontal.

It is a matter of common knowledge, particularly to those skilled in the art to which the invention relates, that levels having single and double pointers are many and variable styles and forms. Therefore, in carrying out the principles of the instant invention, and with a view toward providing a novel and worthy contribution to this line of endeavor, we provide adaptations, primarily structural in nature, which, it is believed, embody distinctions and refinements which will better serve the needs of both manufacturers and users.

Stated with greater particularity, we achieve the desired aims through the instrumentality of a simple and economical unit which is not only usable as an essential component of a complete salable level, but is adapted to be sold for resale in retail stores as a replacement part, making it possible for the owner of the original level to remove a defective unit and replace it himself with a new and ready-to-use unit.

Other objects and advantages will become more readily apparent from the following description in the accompanying illustrative drawings.

In the drawings:

Figure 1 is a side elevational view of a complete level constructed in accordance with the principles of the present invention, Figures 2 and 3 are horizontal and vertical sections, on enlarged scales, taken on the lines 2—2 and 3—3 respectively of Figure 1, looking in the direction of the indicating arrows, Figure 4 is a view in section and elevation of one of the insertable and removable indicator units by itself, Figure 5 is a view like Figure 1 showing a slight modification in construction, and, Figure 6 is a detail view of one of the indicator units employed in the construction seen in Figure 5.

Referring now to the drawings by reference numerals it will be seen that the wooden or equivalent stock or body, which is generally three inches wide and three and one half feet long, is denoted by the numeral 8. It is provided with a centrally disposed indicator unit and duplicated indicator units at opposite ends but at right angles to the central unit. All units are the same in construction and the description of one will suffice for all. It is to be noted, in this connection, that the indicator hand or pointer is suitably pivoted and adapted to assume parallelism with a horizontal plane.

As brought out in Figure 4, the indicator unit embodies a simple and economical insertable and removable frame which is unitarily denoted by the numeral 9. The frame comprises a pair of arcuate or sector shaped end members 10 and these are fitted between the longitudinally disposed and parallel L-shaped frame members. That is to say, the members 10 are securely mounted between the horizontal flanges (Figure 4) 11 of said longitudinal frame members. The flanges 11 correspond in width with the cross section of the end members 10. The remaining angularly disposed flanges 12 constitute attaching flanges and are apertured and provided with permanently attached nuts 13 to receive the threaded ends of assembling bolts 14, as shown in Figure 3. It will be seen therefore that we provide a substantially rectangular frame made up of spaced parallel miniature angle irons, so to speak, and heavy end members 10 fitted between the horizontal flanges thereof. The latter members 10 are provided, one with grooves 15 and the other with slots 15a to receive the end portions of clear glass or plastic closing panels 16. The ends of the panels are arcuate to fit into the grooves and slots and the longitudinal edges are flat and properly contact the equally flat surfaces of the flanges 11. The two panels are spaced on opposite sides of a vertical spider 17 which serves as a mount for the duel or double pointed indicator hand 18. This hand has its central or hub portion 19 mounted on a pivot on the spider, the arrangement being such that the pointers 20 and 21 coact with the zero marks on the graduated scales 22. The scales are provided on opposite visible surfaces of the end members 10 and all features are precision-made so that a double pointed balanced hand stays level or horizontal and registers with the zero marks or graduations on the respective scales. When the frame is tilted in relation to the ever horizontal pointer, the graduations take positions to denote the inclination or degree of tilt.

It is to be pointed out here that the use of balanced indicator hands, weighted and pendulum types of indicators is not new. Nor is it new to enclose pointer means within the confines of the glass or equivalent windows in a frame structure. It is believed that the novelty here resides in the spaced parallel longitudinal frame members attached to arcuate end members 10 whereby to provide, in conjunction with the other parts a precision-made indicator unit which may be used in an original installation, that is in a level ready for sale as such, or, may be sold separately in stores as a replacement unit. The utmost simplicity of the construction of the unit makes it possible for anyone to remove a defective unit and replace it with a new and properly operating unit.

The arrangement of the three units seen in Figure 1 is customary and therefore, we repeat again that is the construction of the insertable and removable and replaceable unit in Figure 4 with which we are primarily concerned.

The same idea, broadly speaking, is carried out in Figures 5 and 6, wherein it will be seen that the level body is denoted by the numeral 23 and is provided with a series of three indicator units. Here, the indicator unit comprises a frame 24 as shown in Figure 6 made up of a simple bar 25 on which the weighted pendulum type indicator hand 26 is centrally and pivotally mounted, as at 27, for coaction with graduations of the scale 28 provided on a longitudinally bowed frame member 29. The frame members 25 and 29 correspond in length and are fastened together by nut equipped end members 30. So, here again, we have a novel frame structure which, in practice is provided with suitable windows and which is advantageous for the same reason alluded to in connection with the unit disclosed in Figure 4.

A careful consideration of the foregoing description in conjuncton with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

A level unit for installation in an aperture in a conventional type stock for replacing a correspondingly constructed damaged or inefficient unit comprising a substantially rectangular frame embodying a pair of duplicate spaced parallel longitudinal frame members, said frame members being substantially L-shaped in cross-section and each including a relatively wide flange carrying an outstanding narrower flange, said narrower flanges being adapted to overlie portions of the stock for attachment to said stock, a pair of shorter sector-shaped end members, the latter being rectangular in cross-section and secured between coacting wide flanges of said L-shaped members, the cross-sections of said sector-shaped end members corresponding to the widths of the stated wide flanges, the exposed outer surfaces of said sector-shaped members being calibrated to function as scales, a spider spanning the space between and mounted between the longitudinal frame members, a pointer pivoted on said spider and having its end portions arranged for coaction with the graduations on said scales, one end member being provided on its inward peripheral surface with spaced parallel grooves for reception of closing panels, the remaining end member having spaced parallel slots registerable with the respective grooves for passage of said panels, and substantially rectangular glass panels having corresponding end portions of arcuate form and fitted respectively into the grooves at corresponding ends and having their opposite corresponding end portions removably and accessibly lodged in said slots.

WILLIAM E. FARROW.
WILLIAM L. FARROW.

REFERENCES CITED

The following references are of record in the file of this patent:

UNITED STATES PATENTS

| Number | Name | Date |
|---|---|---|
| 379,662 | Ritz | Mar. 20, 1888 |
| 567,347 | Kelly | Sept. 8, 1896 |
| 886,333 | Southword | Apr. 28, 1908 |
| 896,483 | Thies | Aug. 18, 1908 |
| 1,312,303 | Berry | Aug. 5, 1919 |
| 1,359,474 | Wernick | Nov. 16, 1920 |
| 1,410,283 | Bengel | Mar. 21, 1922 |
| 1,618,262 | Barger | Feb. 22, 1927 |
| 1,625,683 | Rail | Apr. 19, 1927 |
| 1,797,047 | Christoph | Mar. 17, 1931 |
| 2,247,541 | Adams | July 1, 1941 |